(12) United States Patent
Duelli

(10) Patent No.: US 7,959,130 B2
(45) Date of Patent: Jun. 14, 2011

(54) VACUUM VALVE AND CLOSURE PLATE FOR A VACUUM VALVE

(75) Inventor: Bernhard Duelli, Uebersaxen (AT)

(73) Assignee: Vat Holding AG, Haag (CH)

( * ) Notice: Subject to any disclaimer, the term of this patent is extended or adjusted under 35 U.S.C. 154(b) by 147 days.

(21) Appl. No.: 12/504,358

(22) Filed: Jul. 16, 2009

(65) Prior Publication Data

US 2010/0012878 A1 Jan. 21, 2010

(30) Foreign Application Priority Data

Jul. 18, 2008 (EP) ..................................... 08012989

(51) Int. Cl.
*F16K 3/314* (2006.01)
(52) U.S. Cl. ........................................ 251/326; 251/366
(58) Field of Classification Search .................. 251/326, 251/327, 328, 329, 193, 366
See application file for complete search history.

(56) References Cited

U.S. PATENT DOCUMENTS

| | | | |
|---|---|---|---|
| 3,367,625 A * | 2/1968 | Fortune | 251/329 |
| 4,524,950 A * | 6/1985 | Vitas et al. | 251/326 |
| 4,809,950 A | 3/1989 | Geiser | |
| 4,881,717 A | 11/1989 | Geiser | |
| 4,964,432 A | 10/1990 | Chou | |
| 6,056,266 A | 5/2000 | Blecha | |
| 6,089,537 A | 7/2000 | Olmsted | |
| 6,416,037 B1 | 7/2002 | Geiser | |
| 7,134,642 B2 * | 11/2006 | Seitz | 251/326 |
| 2006/0011140 A1 * | 1/2006 | Blahnik et al. | 118/733 |
| 2006/0124886 A1 * | 6/2006 | Brenes | 251/326 |
| 2007/0257220 A1 * | 11/2007 | Litscher et al. | 251/62 |
| 2008/0017823 A1 | 1/2008 | Litscher | |

FOREIGN PATENT DOCUMENTS

| DE | 20 2006 015675 U1 | 12/2006 |
|---|---|---|
| JP | 6241344 A | 8/1994 |

* cited by examiner

*Primary Examiner* — John Bastianelli
(74) *Attorney, Agent, or Firm* — Muncy, Geissler, Olds & Lowe, PLLC

(57) ABSTRACT

The invention relates to a vacuum valve for gas-tight sealing of a flow path, comprising at least one thrust rod, which has a cylindrical connecting section, and a closure plate which is removably mounted on the thrust rod and has at least one concave, semicircular first rod recess corresponding to the connecting section. A clamping piece, which has a concave, semicircular second rod recess corresponding to the connecting section, is adjustably mounted by means of a mechanical fixing element on the closure plate in such a way that the semicircular first rod recess and the opposite semicircular second rod recess define a cylindrical holding region which is adjustable in width and in which the cylindrical connecting section is detachably held.

15 Claims, 5 Drawing Sheets

VACUUM VALVE AND CLOSURE PLATE FOR A VACUUM VALVE

The present application claims priority to European Patent Application No.: 08012989.3, which was filed in the EPO on Jul. 18, 2008, and which is herein incorporated by reference in its entirety.

The invention relates to a vacuum valve for gas-tight sealing of a flow path, comprising a closure plate removably mounted on at least one thrust rod, according to the preamble of claim 1, and a closure plate according to the preamble of claim 12.

Vacuum valves for substantially gas-tight sealing of a flow path which leads through an opening formed in a valve housing are known in various embodiments from the prior art. Vacuum gate valves are used in particular of the area of IC and semiconductor manufacture, which must take place in a protected atmosphere as far as possible without the presence of contaminating particles. For example, in a manufacturing plant for semiconductor wafers or liquid crystal substrates, the highly sensitive semiconductor or liquid crystal elements pass sequentially through a plurality of process chambers in which the semiconductor elements present inside the process chambers are processed by means of a processing apparatus in each case. Both during the processing within the process chambers and during transport from process chamber to process chamber, the highly sensitive semiconductor elements must always be present in a protected atmosphere—in particular in a vacuum. The process chambers are connected to one another, for example, via connecting passages, the process chambers being capable of being opened by means of vacuum gate valves for transferring the parts from one process chamber to the next and subsequently being sealed gas-tight for carrying out the respective manufacturing step. Because of the field of use described, such valves are also referred to as vacuum transfer valves and, owing to their rectangular opening cross-section, also as rectangular gates.

Different embodiments of vacuum valves, in particular the sealing and drive technologies thereof, are known from the prior art. Depending on the respective drive technologies, a distinction is made in particular between gate valves, also referred to as valve gates or rectangular gates, and shuttle valves, the closing and opening in the prior art generally taking place in two steps. In a first step, a valve closure, in particular a closure plate, in the case of a gate valve, as disclosed, for example, in U.S. Pat. No. 6,416,037 (Geiser) or U.S. Pat. No. 6,056,266 (Blecha), is moved linearly over an opening substantially parallel to the valve seat or, in the case of a shuttle valve, as disclosed, for example, in U.S. Pat. No. 6,089,537 (Olmsted), pivoted about a pivot axis over the opening without contact taking place between the closure plate and the valve seat of the valve housing as a result. In a second step, the closure plate is pressed with its closure side onto the valve seat of the valve housing so that the opening is sealed gas-tight. Sealing can be effected, for example, either via a sealing ring which is arranged on the closure side of the valve plate and is pressed onto the valve seat running round the opening or via a sealing ring on the valve seat, against which the closure side of the valve plate is pressed. The sealing ring can be held in a groove and/or attached by vulcanization.

Gate valves are also known in which the closing and sealing process takes place via a single linear movement. Such a valve is, for example, the transfer valve from VAT Vakuumventile AG in Haag, Switzerland, which is known by the product designation "MONOVAT series 02 and 03" and designed as a rectangular insert valve. The design and the mode of operation of such a valve are described, for example, in U.S. Pat. No. 4,809,950 (Geiser) and U.S. Pat. No. 4,881,717 (Geiser). The valve described there has, in its housing, a sealing surface which, when viewed in the direction of the axis of the valve passage, has sections which are located one behind the other and become, via continuous curves, flat sealing surface sections running laterally outward, the imaginary generators of this sealing surface which is in one part but has a plurality of sections being parallel to the axis of the valve passage. The sealing surface is machined. The closure member has a contact surface corresponding thereto for the circumferentially closed seal. In a more detailed description, the so-called valve gate has a gate housing and a gate passage which can be closed by a closure member displaceable in its plane. A sealing surface against which a circumferentially closed seal arranged on the closure member rests in the closed position of said closure member is provided in the region of the gate passage, the imaginary, straight generators of the sealing surface being parallel to the axis of the gate passage. The circumferentially closed, one-piece seal has sections of different lengths and/or shapes which lie in different planes, two main sections of the circumferentially closed seal lying in planes which are at right angles to the axis of the gate passage and a distance apart. The two main sections of the seal are connected by lateral sections. The closure member has a surface corresponding to the shape of the sealing surface of the housing and carrying the circumferentially closed seal. The lateral sections of the circumferentially closed seal are U-shaped. In each case, the limbs of these U-shaped lateral sections lie in a plane. Those sections of the sealing surface which are located one behind the other when viewed in the axial direction of the gate passage become flat sealing surface sections running laterally outward for contact with the main sections of the seal in that region in which they have a common, straight generator parallel to the axis. These flat sealing surface sections lie in planes parallel to one another and to the axis of the gate passage. Since the closure member comprises one part, it can be exposed to high acceleration forces, so that this valve can also be used for fast and emergency closures. Since the closing and sealing can be effected by means of a single linear movement, very fast closing and opening of the valve are possible.

A suitable drive for such a transfer valve which can be closed by means of a linear movement is described in JP 6241344 (Buriida Fuuberuto). The drive described there has eccentrically mounted levers for linear displacement of the thrust rods on which the closure member is mounted.

Since transfer valves are used, inter alia, in the production of highly sensitive semiconductor elements, the particle generation caused in particular by the actuation of the valve and the number of free particles in the valve space must be kept as low as possible. The particle generation is primarily a consequence of friction, for example due to metal-metal contact, in particular between the valve closure and the valve housing or the valve seat, and the valve closure and the thrust rods on which the valve closure is fastened and thus connected to the drive.

A particular challenge for avoiding the particle generation is the connection between the thrust rods of the valve drive and the valve closure, in particular the closure plate.

On the one hand, the closure plate must be connected so firmly to the thrust rod or the thrust rods that precise guidance in the valve housing and exact pressing of the closure plate onto the valve seat are possible without unwanted material contacts in association with a high load capacity of the closure plate in the closed state of the valve. An unwanted relative movement of the closure plate on the thrust rods can, owing to the material friction caused thereby, lead to production of particles due to friction which could contaminate the high-purity atmosphere in the valve space. Play-free, firm contact between thrust rod and closure plate is therefore generally strived for in the prior art. The aim is as parallel alignment as possible of the closure surface of the closure plate with the valve seat when pressing on the closure plate for permitting uniform sealing contact and for avoiding excessive wear—in particular of the sealing element. Instead of a firm, play-free and aligned connection between thrust rod and closure plate, a connection which is movable in a limited range is likewise possible so that the closure plate aligns itself when pressed on. However, this self-alignment always results in a relative movement between thrust rod and closure plate during pressing, with the result that contaminating particles due to friction are produced.

On the other hand, for maintenance and/or replacement, the closure plate must be capable of being removed from the thrust rod and mounted again as far as possible without major dismantling effort. The therefore necessary provision of a connection which is detachable without major dismantling effort does however give rise to a conflict of aims with the desired avoidance of particle generation, since frictional material contact and the production of particles can be avoided only with considerable effort during the dismantling of the closure plate from the thrust rods and mounting of said closure plate thereon. The danger of an unwanted relative movement between the closure plate and the thrust rods is of course greater in the case of a detachable connection than in the case of a non-detachable, in particular interlocking, connection.

The prior art discloses providing one or two open semicircular recesses for two thrust rods on the back of the closure plate and mounting the thrust rods by means of in each case a screw which is led through in each case one transverse bore in the thrust rod and engages a threaded bore formed in the recess. The connection which is axial with respect to the thrust rod is both frictional due to the force which is applied via the screw and acts perpendicularly to the closure plate between the thrust rod and the recess and interlocking via a shoulder-like step in the thrust rod, which step acts only in the closing direction. This step supports the thrust rod at the upper edge of the semicircular recess during closing of the closure plate by means of the linear movement and pressing of the closure plate onto the valve seat.

Such a fastening is used, for example, in the case of the transfer valve from VAT Vakuumventile AG in Haag, Switzerland, which is known by the product designation "MONO-VAT series 02 and 03" and designed as a rectangular insert valve. In order to permit exact alignment of the closure plate with the valve seat, the screws are initially not tightened after mounting of the closure plate, so that a relative movement between the thrust rods and the closure plate is still possible by overcoming the friction during closing of the valve. The valve is then closed. Because the fastening between the thrust rods and the closure plate is still not completely fixed, the valve plate aligns itself exactly with the valve seat. Moreover, the thrust rods initially held by a frictional connection along the linear adjustment path move relative to the closure plate until the shoulder-like step comes to rest firmly on the upper edge of the semicircular recess and the closing force thus occurs via interlocking. In the next step, the screws are tightened so that a movement of the closure plate relative to the thrust rods is no longer possible. The two shoulder-like steps of the two thrust rods rest firmly on the upper edges of the semicircular recesses and are fixed there by frictional contact as a result of tightening of the screws. Since a large force acts on the connections between the thrust rods and the closure plate only in the linear closing direction and this large force is absorbed in an interlocking manner via the shoulder-like steps, there are no substantial displacements between the thrust rods and the closure plate after tightening of the screws, so that production of material particles due to friction is kept relatively low during normal operation of the vacuum valve. The particles produced on the thrust rods as a result of the alignment prior to tightening of the screws are removed by means of cleaning. Owing to the fixing of the closure plate on the thrust rods, scarcely any further particles are produced until the screws are loosened again.

A disadvantage of the known connection between the closure plate and the thrust rod is a relatively great time requirement associated with the loosening and tightening of the screws during the dismantling of the closure plate from the thrust rods and mounting of said closure plate on said thrust rods. Without insertion of the screws, the closure plate is not held on the thrust rod. In the case of two thrust rods, the closure plate must therefore be manually held until both screws have been inserted into the threads. The opposite applies for dismantling. The two-stage tightening of the screws, described above, for exact alignment of the closure plate is a problem which could not be adequately solved by the connections known to date. A connecting element which is faster and more convenient to operate and by means of which the closure plate is aligned relatively exactly with the thrust rod after mounting, which should be as simple as possible, and before the first closing of the valve would be desirable in order to be able to prevent material friction and the production of particles immediately after the mounting of the closure plate on the thrust rods.

It is therefore an object of the invention to provide a closure plate of a vacuum valve which can be mounted on the at least one thrust rod of the valve drive as exactly as possible and with self-alignment and can be removed again without major effort within a short time, the existence of free material particles within the valve space, caused during the operation of the vacuum valve, being kept low.

This object is achieved by realizing the defining features of the independent claims. Features which further develop the invention in alternative or advantageous ways are described in the dependent patent claims.

The vacuum valve to which the invention relates serves for gas-tight sealing of a flow path, the flow path being understood in general to mean a closeable opening path between two regions—in particular between a process chamber for semiconductor manufacture and either a further process chamber or the exterior. The flow path is, for example, a connecting passage between two process chambers connected to one another, the process chambers being capable of being opened by means of the vacuum valve for transferring the semiconductor parts from one process chamber to the next and then sealed gas-tight for carrying out the respective manufacturing step. Because of the field of use described, such valves are also referred to as vacuum transfer valves and, owing to their generally rectangular opening cross-section, also as rectangular gates. However, any desired other application of the vacuum valve according to the invention for substantially gas-tight sealing of any desired flow path is of course also meant. The vacuum valve comprises a valve housing having an opening for the flow path. The opening is, for example, rectangular and has a central axis which extends in the region of the opening in the middle of the flow path and parallel thereto. This opening axis is, for example, perpendicular to the area defined by the opening. The opening is surrounded by a valve seat surface which extends around the opening.

In addition, the vacuum valve has at least one thrust rod—preferably two thrust rods. A closure plate is removably mounted on the at least one thrust rod. The at least one thrust rod is substantially linearly adjustable via a valve drive along its thrust rod axis which runs substantially transversely to the opening axis, i.e. in an imaginary plane extending perpendicularly to the opening axis, in the plane of the closure plate. The thrust rod axis is in particular parallel to or collinear with the central axis of the preferably straight thrust rod. The plane of the closure plate which is defined by the closure plate is preferably substantially parallel to the area defined by the opening. The valve drive is formed, for example, by a valve drive known from the prior art. A suitable drive for a vacuum valve closeable by means of a single linear movement is described in JP 6241344 (Buriida Fuuberuto). The valve drive described there has eccentrically mounted levers for linear displacement of the thrust rods. In the case of such a drive and such a closure plate, the closing force acts substantially axially on the thrust rod, so that the closing of the vacuum valve does not lead to a force acting laterally on the thrust rod. Only a pressure difference in the flow path produces a lateral force, it being possible to avoid bending of the thrust rod by supporting the closure plate on the valve housing.

Alternatively, the valve drive is formed in such a way that closing and opening take place in two steps. In a first step, the closure plate is moved linearly along the thrust rod axis over an opening substantially parallel to the valve seat. In a second step, the closure plate is pressed with its closure side onto the valve seat of the valve housing so that the opening is sealed gas-tight. Depending on the design of the drive, this results in a considerable force acting laterally on the thrust rod, and it is for this reason that the thrust rod must have appropriately rigid dimensioning for avoiding excessive bending.

At the end of the thrust rod, i.e. at the thrust rod end, a cylindrical connecting section is formed. The connecting section preferably has, in the plane perpendicular to the thrust rod axis, a circular cross-section which is substantially constant along the thrust rod axis in the region of the effective connecting section.

The closure plate removably mounted on the at least one thrust rod has a closure side and a back opposite and substantially parallel thereto, so that the closure side and the back point in opposite directions. In one embodiment, the plane of the closure plate runs centrally and parallel between the planes of the closure side and of the back.

In addition, the closure plate has a closure surface corresponding to the valve seat surface. Corresponding is to be understood as meaning that the closure surface and the valve seat surface are formed in such a way that the closure plate can be pressed with its closure surface onto the valve seat in such a way that a tight contact can be produced between the closure surface and the valve seat surface around the opening. By producing the sealing contact between the closure surface and the valve seat surface by means of the valve drive, the flow path and hence the opening are closed gas-tight, the closure side of the closure plate pointing toward the opening and the back facing away from the opening.

Depending on the design of the valve seat and the valve type, the closure surface can point either to the side into which the thrust rod axes also point or to the closure side. The design of the closure surface is discussed in more detail below.

Depending on the number of thrust rods, at least one concave, semicircular first rod recess is formed on the closure plate, either on the closure side or on the back of the closure plate. That side of the closure plate on which the first rod recess is formed is referred to as the fastening side below. The first rod recess corresponds to the connecting section of the thrust rod in such a way that it is possible to couple the connecting section to the first rod recess. The first rod recess has in particular a semicircular channel shape, i.e. the shape of a semi cylindrical shell, in which the connecting section fitting into the channel shape, in particular cylindrical connecting section, can be arranged.

In particular, two thrust rods and two first rod recesses, which are arranged parallel in the plane of the closure plate, are provided.

The respective connecting section of the at least one thrust rod is detachably fixed in the first rod recess by fastening means.

The fastening means are in the form of a clamping piece and a mechanical fixing element, for example at least one screw. The clamping piece has a concave, semicircular second rod recess corresponding to the connecting section. The second rod recess likewise has in particular a semicircular channel shape, i.e. a shape of a semi cylindrical shell.

By means of the mechanical fixing element, the clamping piece is adjustably mounted on the fastening side of the closure plate in such a way that the semicircular first rod recess and the opposite semicircular second rod recess define a cylindrical recess region which is adjustable in width. When the closure disc is mounted on the thrust rod, the cylindrical connecting section is detachably held in this holding region. The thrust rod can be introduced with its connecting section into the holding region in the direction of the thrust rod and can be removed again in the opposite direction.

In other words, the semicircular first rod recess of the closure plate and the semicircular second rod recess of the clamping piece are opposite one another. Thus, the rod recesses form substantially two more or less complete semicircular shells of the cylindrical holding region. The width adjustability is achieved by virtue of the fact that the clamping piece and hence the second rod recess are adjustable relative to the fastening side of the closure plate and hence to the first rod recess in a substantially perpendicular direction to the fastening side and to the planes of the closure plate. The distance between the first rod recess and the second rod recess is therefore variable in a direction perpendicular to the planes of the closure plate by means of the mechanical fixing element. Since the shape of the holding region is dependent to a certain extent on the instantaneous setting of the clamping piece and the spacing of the rod recesses, the shape of the holding region is not exactly cylindrical or is cylindrical only at a certain distance and in particular is interrupted by a joint between the clamping piece and the closure plate. Likewise, the shape of the semicircular rod recesses may differ from the semicircular shape, i.e. the shape of a semi cylindrical shell. The shape of the first rod recess and of the second rod recess is therefore generally to be understood as meaning that the holding region defined is suitable for holding the cylindrical connecting section of the thrust rod and is capable of fixing said section in the thrust rod axis relative to the closure plate by reducing the spacing of the two rod recesses. Of course, it is possible for the semicircular shape, i.e. the semi cylindrical contour of the rod recesses, to be interrupted by steps, grooves or beads, both in the direction of the thrust rod axis and transverse thereto.

A cavity which extends transversely to the thrust rod axis—i.e. in a plane perpendicular to the thrust rod axis—and in which a resilient pin extends transversely to the thrust rod axis—i.e. in a plane perpendicular to the thrust rod axis—and tangentially to the cylindrical holding region is formed in the first rod recess or the second rod recess, the resilient pin projecting with its lateral surface into the cylindrical holding region. In other words, the pin forms a secant of the substantially circular cross-section of the holding region.

Preferably, both ends of the pin are fixed in the cavity, the middle unfixed region of the pin extending between the two ends, partly in the cavity and partly in the cylindrical holding region. Since the middle region of the pin extends freely and is not fixed, it is elastic perpendicularly to its longitudinal dimension and bends between its ends on exertion of a force which acts in the radial direction of the cylindrical holding region, outward on the lateral surface of the pin, in the middle region thereof. This bending produces the elasticity of the pin. The elongated pin may have a cylindrical shape with a circular cross-section, or an elliptical, rectangular, square, polygonal or other cross-section. The lateral surface of the general cylinder forms the lateral surface of the pin.

Alternatively, it is possible for only one end of the pin to be fixed in the cavity and the other to be freely movable, with the result that the elasticity of the pin increases.

The connecting section of the thrust rod has a joint transversely to the thrust rod axis and corresponding to the pin. The joint extends either around the total connecting section of the thrust rod or only partly around the connecting section or is formed laterally in the form of a notch. Preferably, the joint extends on a plane to which the thrust rod axis is a normal, i.e. a plane perpendicular to the thrust rod axis.

The joint extends in such a way that—in the mounted state of the closure plate on the thrust rod, in which the connecting section is inserted into the holding region—the pin is clamped with its lateral surface in the joint by means of the clamping piece and the fixing element. Thus, the pin fixes the thrust rod along the thrust rod axis. If the joint runs only partly around the connecting section, the joint is formed on that side of the connecting section which faces the pin.

The joint has in particular a substantially V-shaped cross-section tapering inward into the joint, a semicircular cross-section or another cross-section.

Because the pin projects tangentially into the holding region, an elastic constriction is created in the holding region. For mounting the closure plate, the width of the holding region, i.e. the spacing of the rod recesses, is adjusted in such a way that the connecting section can be inserted into the holding region with a certain radial play, i.e. with clearance play. On mounting the closure plate on the at least one thrust rod and hence on inserting the connecting section into the holding region, the pin forming the constriction is first elastically deformed in that the pin bends and is forced into the cavity. Once the closure plate has been completely mounted so that the connecting section has been completely inserted into the holding region, the pin and the joint are at the same height so that the bent pin partly relaxes, emerges from the cavity and fits closely in the joint. By means of this clamping of the pin in the joint, the closure plate is fixed axially in the direction of the thrust rod axis, partly in an interlocking manner, and is held axially so that, in particular in the case of thrust rods pointing downward, slipping of the closure plate downward is avoided without an adjustment of the width of the holding region being required. Thus, the closure plate is already partly fixed without mechanical adjustment of the fixing element.

In this fixed state, a precise alignment of the closure plate with the thrust rod can now be effected by closing the valve and pressing the closure plate onto the valve seat. As a result, the closure surface aligns itself exactly with the valve seat surface, and the closure plate assumes the desired position on the at least one thrust rod. In this highly precisely aligned state, the clamping piece can now be adjusted by means of the fixing element and the opening width of the holding region can be reduced so that the two opposite rod recesses clamp the connecting section of the thrust rod, which connecting section is located in between, and fix it by a frictional connection. As a result, the bent pin is further deformed and is clamped even more firmly in the joint, with the result that the axial fixing of the closure plate on the thrust rod is increased.

Because the closure plate can be easily aligned with the thrust rod, adjustment of the fixing element is required only for the final fixing, and the axial fixing is both interlocking and frictional, fast and easy mounting of the closure plate on the at least one thrust rod and removal of said closure plate from said thrust rod are possible. Furthermore, the particle generation is kept low owing to the avoidance of multiple adjustment of the fixing element, the preliminary axial interlocking fixing and the additional final interlocking axial fixing.

The vacuum valve according to the invention and the closure plate according to the invention are described in more detail below, purely by way of example, with reference to specific working examples shown schematically in the drawings.

Specifically,

Figure 3A:
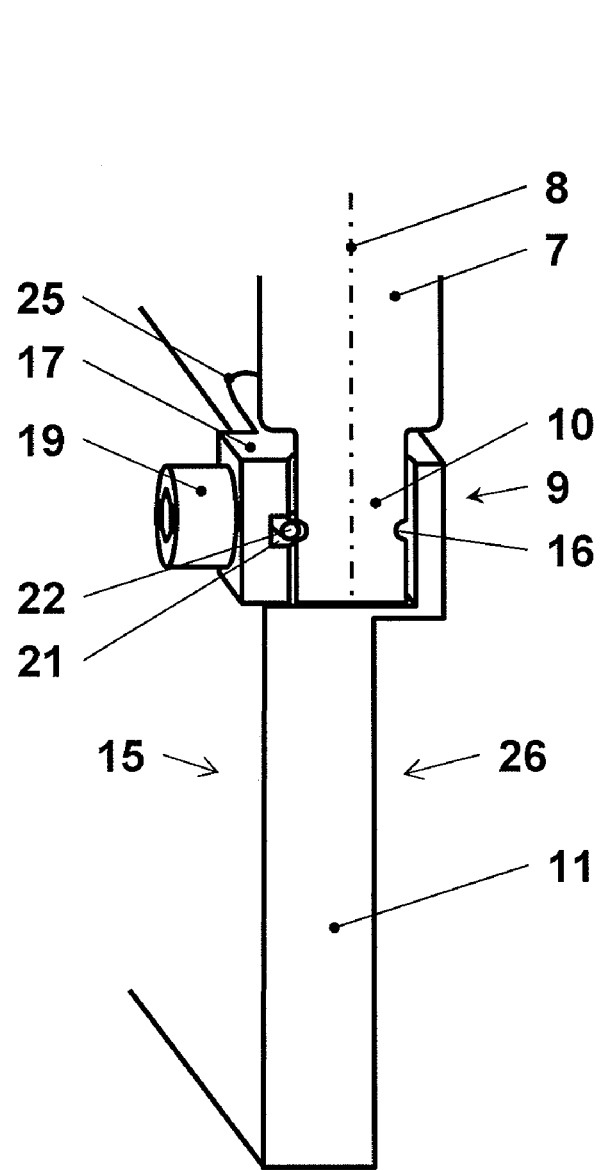
Figure 3B:
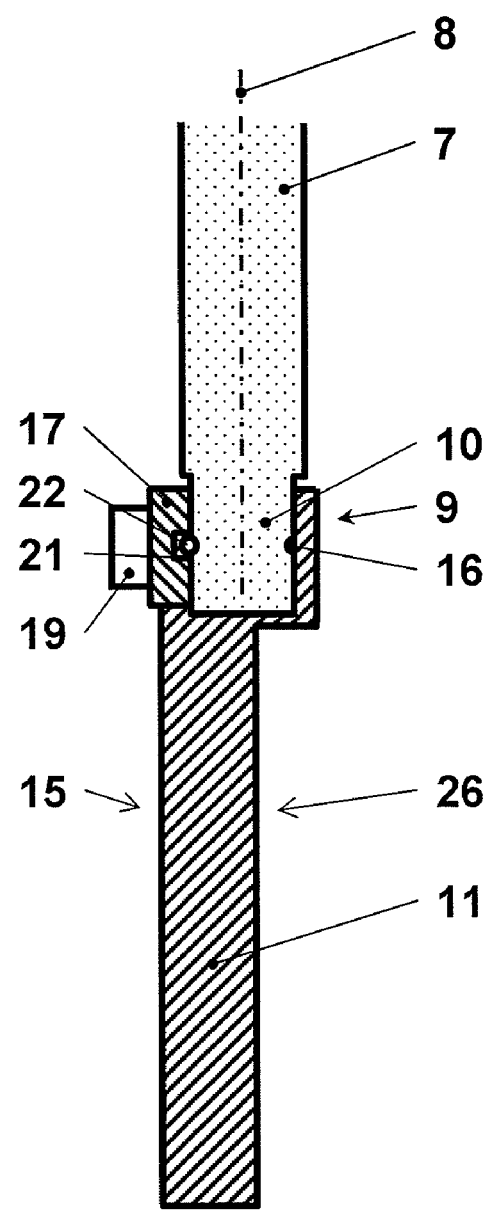
Figure 4:
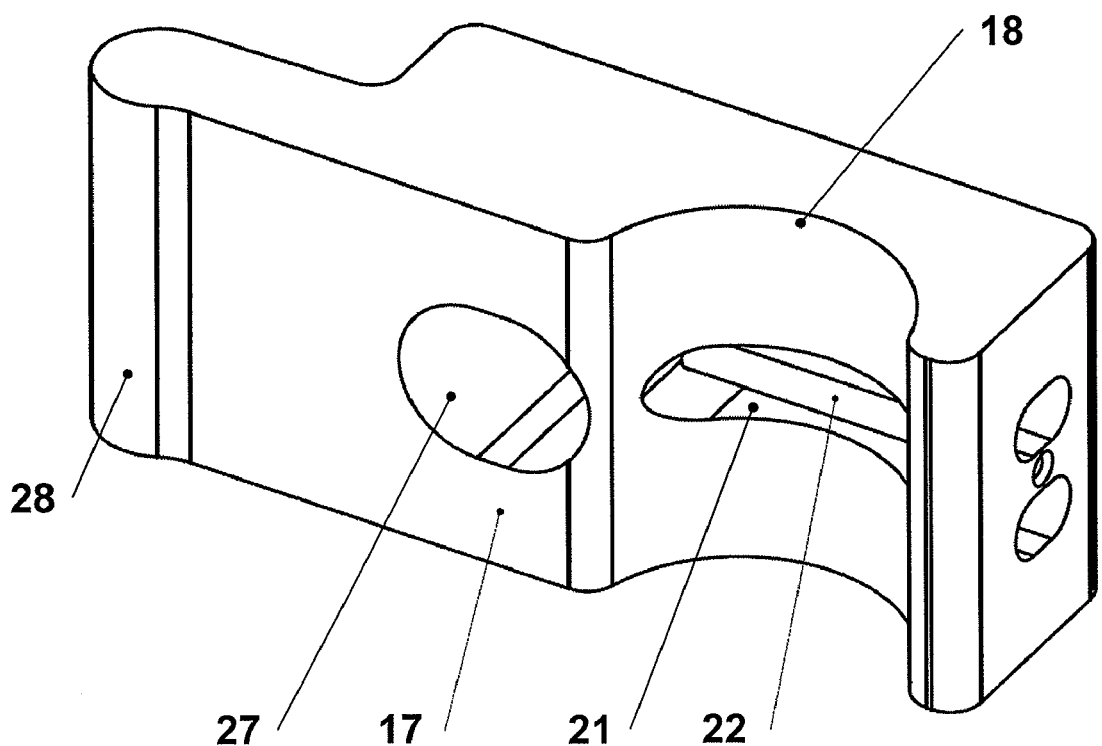
Figure 5:
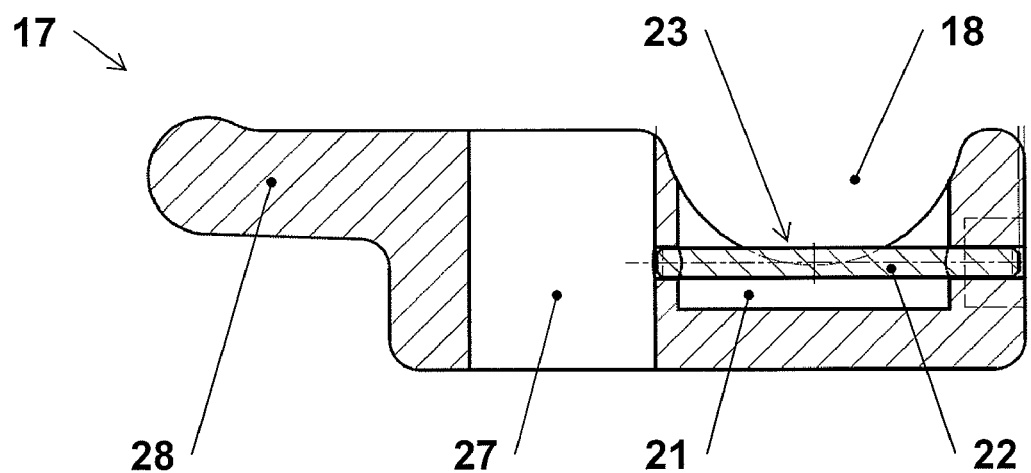
Figure 6A:
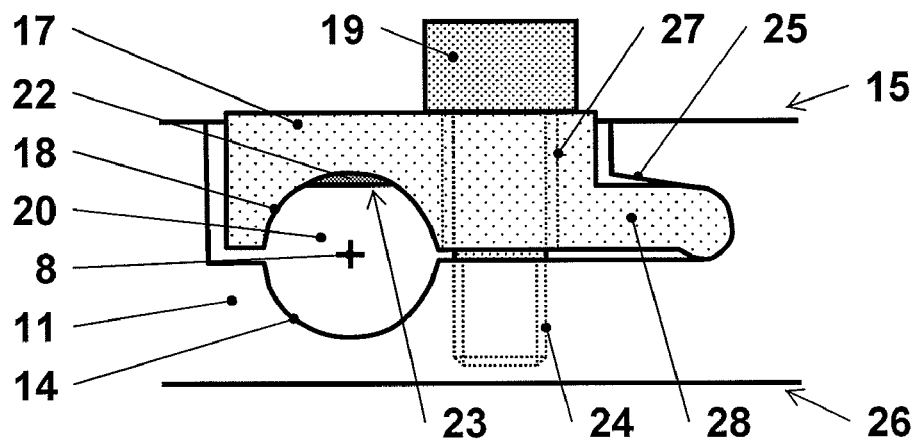
Figure 6B:
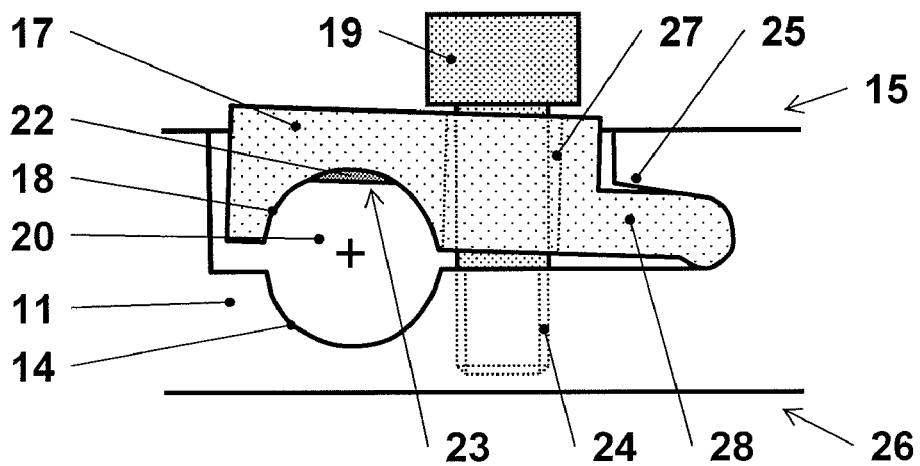
Figure 7:
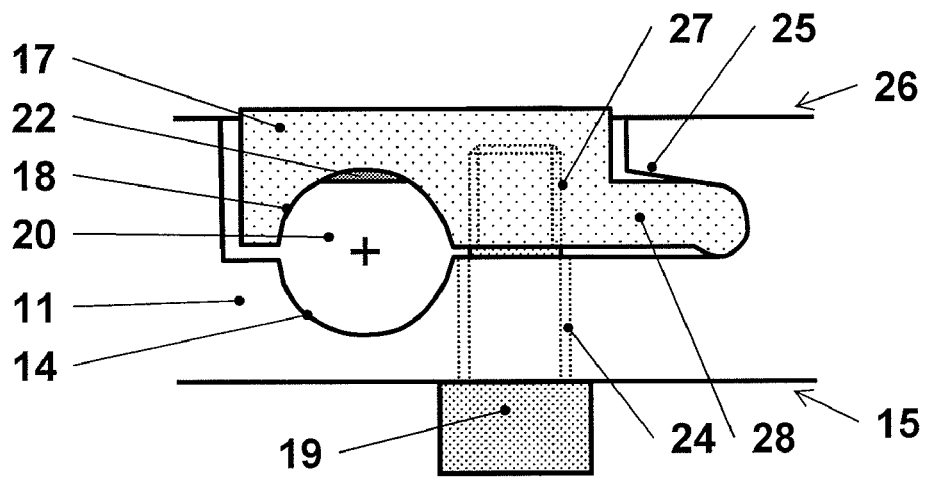

FIG. 3*a* shows a transverse section of the closure plate and of the thrust rod in oblique view;

FIG. 3*b* shows a cross-sectional view of the closure plate and of the thrust rod;

FIG. 4 shows a detailed view of the clamping piece;

FIG. 5 shows a cross-sectional view of the clamping piece;

FIG. 6*a* shows a plan view of the closure plate with the clamping piece in the closed position;

FIG. 6*b* shows a plan view of the closure plate with the clamping piece in the open position; and FIG. 7 shows a plan view of an alternative embodiment of the closure plate with a clamping piece in the closed position.

FIGS. 1 to 6*b* show substantially a single exemplary embodiment of the invention in different views, states and degrees of detail, and these figures are therefore described in part together. FIG. 7 shows an alternative embodiment of the vacuum valve in a detailed view. Since common reference numerals are used in part for the figures and the embodiments differ partly only in details, reference numerals already explained beforehand are in some cases not discussed again.

Figure 1:
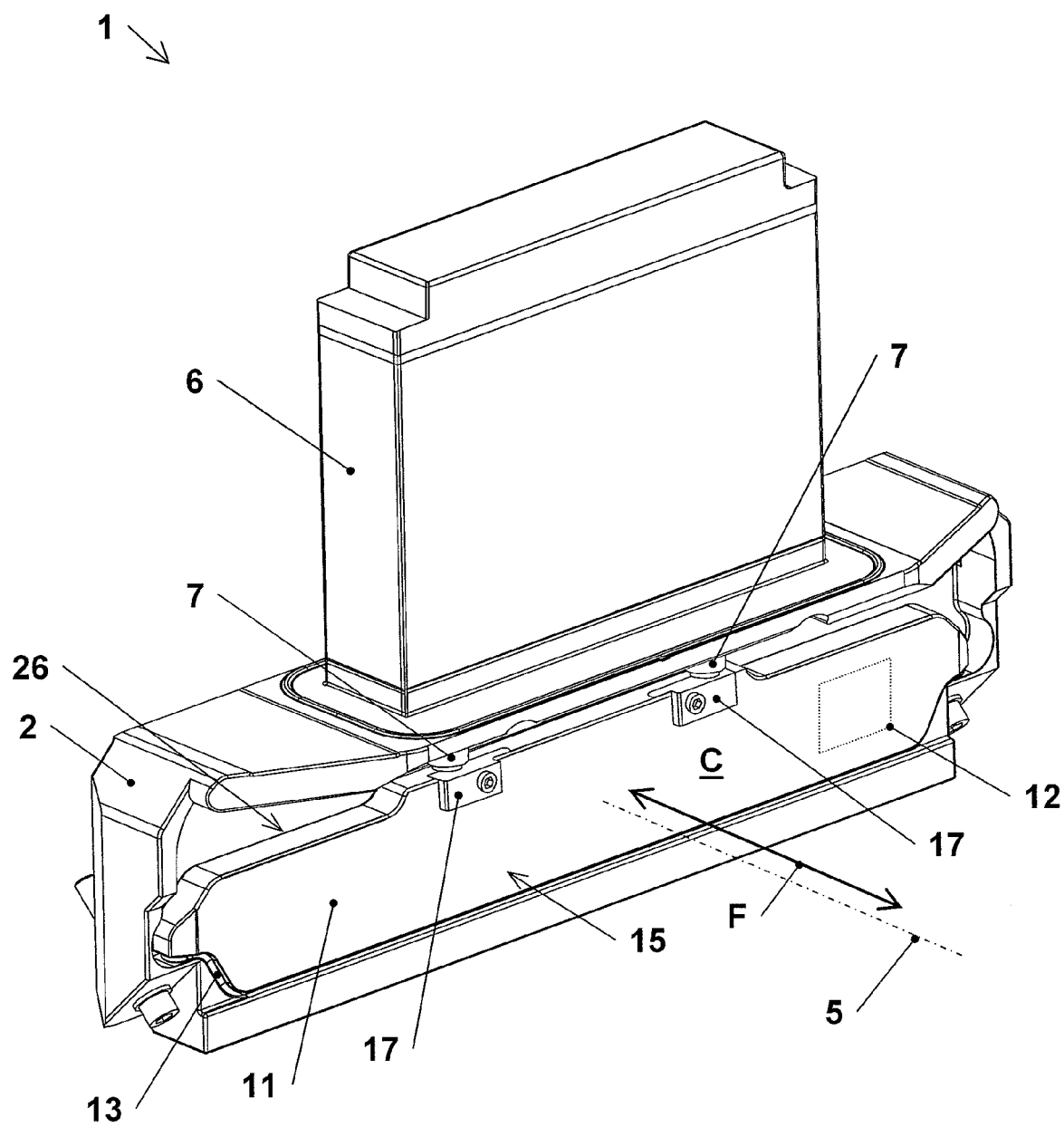
FIG. 1 shows an oblique view of a vacuum valve having a closure plate in the closed position and a valve drive.
Figure 2:
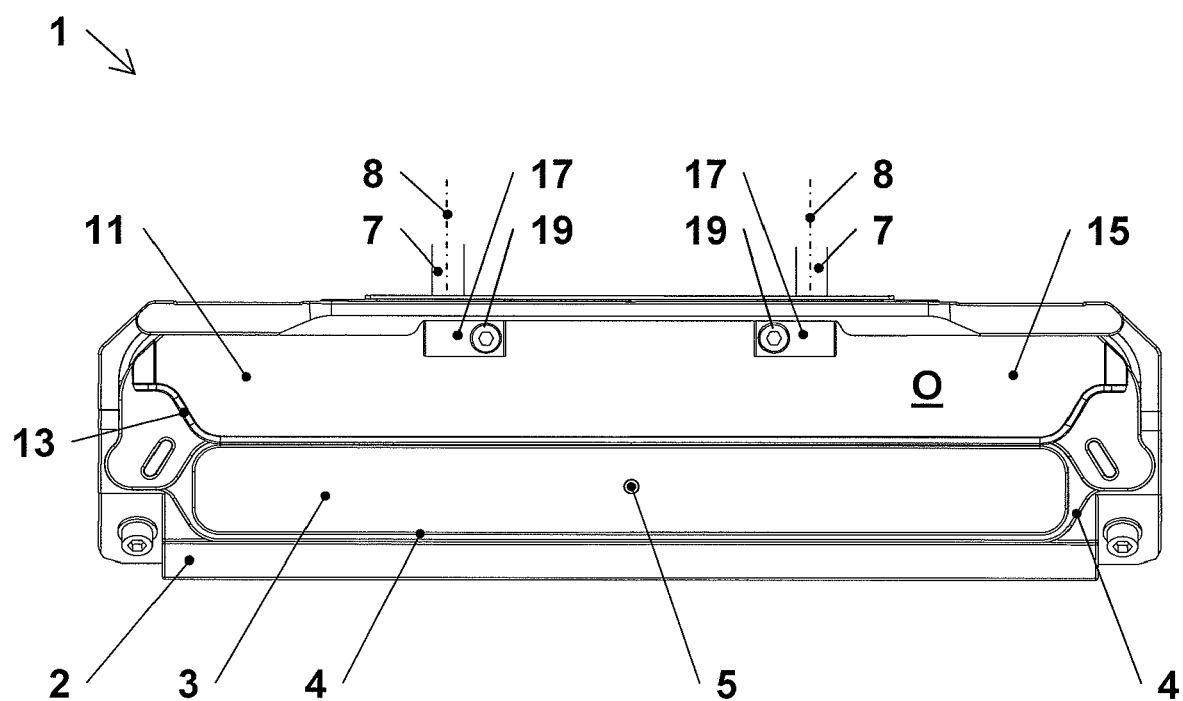
FIG. 2 shows a front view of the vacuum valve from FIG. 1 with the closure plate in the opened position, without a valve drive.

FIGS. 1 and 2 show a vacuum valve 1 in the form of a rectangular gate for gas-tight sealing of a flow part illustrated by means of the arrow F, in an oblique view and in a front view, respectively. FIGS. 3*a*, 3*b* and 6*a* and 6*b* show the closure plate 11 and the components thereof, including the ends of the thrust rods 7 of the vacuum valve 1 from FIGS. 1 and 2. These figures are described together below.

The vacuum valve 1 has a valve housing 2 with an opening 3 for the flow path F. The opening 3 has a rectangular cross-section with rounded corners. FIG. 1 shows the vacuum valve 1 in a closed position C, and it is for this reason that the opening 3 is concealed and is not visible, whereas the opening 3 is clearly evident in the opened position O of the vacuum valve 1 in FIG. 2. The opening 3 has a central opening axis 5 which extends in the region of the opening 3 in the middle of the flow path F and parallel thereto. This opening axis 5 extends perpendicularly to the imaginary area defined by the opening. The opening 3 is surrounded by a valve seat surface 4 which curves around the opening 3 within a plurality of imaginary planes through which the opening axis 4 passes perpendicularly. The valve seat surface 4 points upward in the direction of the valve drive 6.

In addition, the vacuum valve 1 comprises a flat closure plate 11. The closure plate 11 has a closure surface 13 which corresponds to the valve seat surface 4, points downward in the direction of the valve seat surface 4 and likewise curves within a plurality of imaginary planes through which the opening axis 5 passes perpendicularly.

The vacuum valve 1 has two thrust rods 7 which are linearly adjustable by means of the valve drive 6 along their thrust rod axis 8 which is substantially transverse to the opening axis 5. In other words, the thrust rod axes 8 run parallel on a plane to which the opening axis 5 is a normal.

As shown in FIGS. 3a and 3b, the thrust rods 7 have, at their respective thrust rod end 9, a cylindrical connecting section 10. A closure plate 11 which defines a plane 12 of the closure plate is removably mounted on the two thrust rods 7. This imaginary plane 12 of the closure plate is indicated by means of a rectangle in FIG. 1. The closure plate 11 has a closure side 26 and a back 15 substantially parallel and opposite thereto. In addition, it has a closure surface 13 corresponding to the valve seat surface 4 and intended for gas-tight sealing of the flow path F by producing a sealing contact of the closure surface 13 with the valve seat surface 4. This contact is produced by means of the valve drive 6 in that the closure plate 11 is moved linearly along the thrust rod axis 8 and the closure surface 13 of said closure plate is pressed onto the valve seat 4 of the valve housing 2, and is shown in FIG. 1. The closure side 26 of the closure plate 11 points toward the opening 3, the back 15 facing away from the opening 3.

The valve drive 6 is formed in such a way that the thrust rod 7 is linearly adjustable by means of the valve drive 6 along the thrust rod axis 8. The valve seat surface 4 surrounds the opening 3 in a curved and closed manner. The normals to the at least partly curved valve seat surface 4 and to the closure surface 13 are substantially parallel to the plane 13 of the closure plate. The closure plate 11 is thus linearly displaceable by means of the valve drive 6 along the linear adjustment path of the two thrust rod 7, which are parallel to the thrust rod axis 8, between an opened position O freeing the opening 3 and a position C in which said opening is closed gas-tight and said closure disc is moved linearly over the opening 3 and hence pressed with the closure surface 13 substantially in the closing direction of the linear adjustment path onto the valve seat surface 4.

The geometric normals to the surface are to be understood as meaning the perpendiculars to the contact area of the valve seat surface 4 and of the closure surface 3, which contact area runs around the opening 3 when the vacuum valve 1 is in the closed state. This contact area is formed, for example, by the contact surface of a sealing tape of the closure surface 13 and of the valve seat surface 4. This definition is to be understood as meaning in general that the valve seat surface 4 and the closure surface 13 are formed in such a way that, on closing the vacuum valve 1 along the linear closing direction, the pressing, i.e. the direction of the pressures, of the closure surface 13 onto the valve seat surface 4 is substantially in a plane which is substantially parallel to the plane 12 of the closure plate, so that shear forces in a direction parallel to the opening axis 5 are completely or substantially avoided. The linear adjustment path is the straight line between the opened and the closed position O and C, respectively, of the closure plate 11, preferably parallel to the thrust rod axis 8. A vacuum valve having a valve seat surface 4 and closure surface 13 designed in this manner is substantially known from the prior art, for example as a rectangular insert valve developed and sold under the product designation "MONOVAT series 02 and 03" by VAT Vakuumventile AG in Haag, Switzerland. The design and the mode of operation of such a valve are described, for example, in U.S. Pat. No. 4,809,950 (Geiser) and U.S. Pat. No. 4,881,717 (Geiser), and it is for this reason that the design is not discussed in more detail at this point.

The closure plate 11 has two concave, semicircular first rod recesses 14 corresponding to the connecting section 10 (cf. FIGS. 6a and 6b), which are formed on a fastening side on the closure plate 11. The fastening side is formed by the back 15 in the case of the working example of FIGS. 1 to 6b and by closure side 26 in the case of the working example from FIG. 7.

The respective connecting section 10 of the thrust rods 7 is detachably fixed in the two first rod recesses 14 by means of a clamping piece 17 and mechanical fixing element 19.

The clamping piece 17 has a concave, semicircular second rod recess 18 corresponding to the connecting section 10, as shown in FIGS. 6a and 6b. By means of the mechanical fixing element 19, the clamping piece 17 is adjustably mounted on the fastening side 15 of the closure plate 11 in such a way that the semicircular first rod recess 14 and the opposite semicircular second rod recess 18 define a cylindrical holding region 20 which is adjustable in width and in which the cylindrical connecting section 10 is detachably held, as shown in FIGS. 3a and 3b and 6a and 6b. A cavity 21 which extends transversely to the thrust rod axis 8 and in which a resilient cylindrical pin 22 extends transversely to the thrust rod axis 8 and tangentially to the cylindrical holding region 20, as also shown in detail in FIGS. 4 and 5, is formed in the second rod recess 18, or alternatively in the first rod recess 14. The resilient pin 22 projects with its lateral surface 23 into the cylindrical holding region 20. The pin 22 is fixed with its two ends in the cavity 21 and the middle region of the pin 22, which is not fixed, projects between the two ends into the cylindrical holding region 20.

The connecting section 10 of the thrust rod 7 has a joint 16 which is transverse to the thrust rod axis 8, corresponds to the pin 22 and extends in such a way that the pin 22 is clamped with its lateral surface 23 in the joint 16 by means of the clamping piece 17, and the thrust rod 7 is fixed along the thrust rod axis 8, as shown in FIGS. 3a and 3b. The joint 16 extends around the connecting section 10 of the thrust rod 7 on a plane to which the thrust rod axis 8 is a normal. However, it is alternatively possible for the joint 16 not to surround the entire connecting section 10 but to be formed on a side of the connecting section 10 of the thrust rod 7, which side points toward the pin 22. The joint 16 has a cross-section tapering in a substantially V-shaped manner inward into the joint 16, a semicircular cross-section or another desired cross-section.

In the working example shown, the cavity 21 is formed in the second rod recess 18, and the pin 22 is arranged in the clamping piece 17. Alternatively, the cavity 21 and the pin 22 are present in the first rod recess 14 and the closure plate 11, respectively.

In FIGS. 1 to 6b, the mechanical fixing element is formed in each case as at least one screw 19 extending substantially perpendicularly to the plane 12 of the closure plate. The clamping piece 17 is inserted to the side of the first rod recess 14 with a section 28 into an undercut 25 which is formed on the fastening side 15 of the closure plate 11, which undercut is formed in such a way that the clamping piece 17 is fixed in the direction pointing away from the closure plate 11 and perpendicular to the plane 12 of the closure plate. The screw 19 is arranged in a first hole 24, which is formed on the fastening side 15 of the closure plate 11 to the side of the first rod recess 14 and extends substantially perpendicularly to the plane 12 of the closure plate and a corresponding second hole 27 in the clamping piece 17, which extends substantially perpendicularly to the plane 12 of the closure plate. As a result, the undercut 25, the first hole 24, the second hole 27 and the section 28 of the clamping piece 17 are arranged and formed in such a way that the screw 19 presses the clamping piece 17 in a lever-like manner with the second rod recess 18 onto the connecting section 10 of the thrust rod 7. FIG. 6*a* shows the tightened state of the screw 19, in which the thrust rods 7 are firmly fixed in the holding region 20, whereas FIG. 6*b* shows a state in which the thrust rods 7 can be pushed into and pulled out of the respective holding region 20, the pin 22 effecting preliminary axial fixing of the closure plate 11 on the thrust rods 7.

In the first working example according to FIGS. 1 to 6*b*, the first hole 24 in the closure plate is a threaded hole which the screw 19 engages, and the screw 19 is passed through the second hold 27 with play.

In the second working example according to FIG. 7, on the other hand, the second hole 27 in the clamping piece 17 is a threaded hole which the screw 19 engages, and the screw 19 is passed through the first hole 24 with play. In both cases, the head of the respective screw 19 is present in an easily accessible manner on the back 15 of the closure plate 11, but the clamping piece 17 is arranged on the back 15 in the first working example and on the closure side 26 in the second working example, so that in the first case the back 15 and in the second case the closure side 26 is the fastening side. The second embodiment therefore requires no thread in the closure plate 11 since the thread is formed in the clamping piece 17. This is advantageous especially in the case of a closure plate 11 manufactured from aluminum.

Although a vacuum valve 1 which is closeable by means of a single linear movement is illustrated in the working examples shown, the invention also includes vacuum valves in which the valve drive 6, the valve seat surface 4 and the closure surface 13 are formed in such a way that the opening 3 can be closed by moving the closure plate 11 substantially along the thrust rod axis 8 over the opening 3 and pressing the closure plate 11 with the closure surface 13 onto the valve seat surface 4 in the perpendicular direction to the plane 12 of the closure plate.

List of Reference Numerals
1 Vacuum valve
2 Valve housing
3 Opening
4 Valve seat surface
5 Opening axis
6 Valve drive
7 Thrust rod
8 Thrust rod axis
9 Thrust rod end
10 Connecting section (cylindrical) (of the thrust rod 7)
11 Closure plate
12 Plane of the closure plate
13 Closure surface
14 First rod recess (on closure plate 11)
15 Back (=fastening side)
16 Joint
17 Clamping piece
18 Second rod recess (on clamping piece 17)
19 Fixing element (mechanical)=screw
20 Holding region (adjustable in width, cylindrical)
21 Cavity
22 Pin (resilient)
23 Lateral surface (of the pin 22)
24 First hole (in the closure plate)
25 Undercut
26 Closure side (=fastening side)
27 Second hole (in the clamping piece 17)
28 Section (of the clamping piece 17 in undercut 25)
F Flow path
O Opened position
C Closed position

The invention claimed is:

1. A vacuum valve for gas-tight sealing of a flow path, comprising
a valve housing having an opening for the flow path and a valve seat surface surrounding the opening, the opening having an opening axis along the flow path,
a valve drive,
at least one thrust rod,
which is linearly displaceable by means of the valve drive along its thrust rod axis, which is substantially transverse to the opening axis, and
which has a cylindrical connecting section on the thrust rod end,
a closure plate which is removably mounted on the at least one thrust rod and which defines a plane of the closure plate, comprising
a closure side and a back substantially parallel and opposite thereto,
a closure surface corresponding to the valve seat surface and intended for gas-tight sealing of the flow path by production of a sealing contact of the closure surface with the valve seat surface by means of the valve drive, the closure side of the closure plate pointing toward the opening and the back facing away from the opening,
at least one concave, semicircular first rod recess which corresponds to the connecting section and is formed on a fastening side, which is formed by the closure side or the back, on the closure plate,
and
fastening means by which the connecting section of the thrust rod is detachably fixed in the first rod recess,
wherein
the fastening means are in the form of
a clamping piece which has a concave, semicircular second rod recess corresponding to the connecting section, and
a mechanical fixing element, by means of which the clamping piece is mounted on the fastening side of the closure plate adjustably in a manner such that the semicircular first rod recess and the opposite semicircular second rod recess define a cylindrical holding region which is adjustable in width and in which the cylindrical connecting section is detachably held,
a cavity which extends transversely to the thrust rod axis and in which a resilient pin extends transversely to the thrust rod axis and tangentially to the cylindrical holding region being formed in the first rod recess or the second rod recess, the resilient pin projecting with its lateral surface into the cylindrical holding region, and
the connecting section of the thrust rod has a joint which is transverse to the thrust rod axis, corresponds to the pin and extends in such a way that the pin is clamped with its lateral surface by means of the clamping piece in the joint, and the thrust rod is fixed along the thrust rod axis.

2. The vacuum valve as claimed in claim 1, the pin being fixed with its two ends in the cavity and the middle region of the pin, which is not fixed, projecting between the two ends into the cylindrical holding region.

3. The vacuum valve as claimed in claim 1, the join extending around the connecting section of the thrust rod on a plane to which the thrust rod axis is a normal.

4. The vacuum valve as claimed in claim 1, the joint being formed on a side of the connecting section of the thrust rod, which side points toward the pin, and extending on a plane to which the thrust rod axis is a normal.

5. The vacuum valve as claimed in claim 1, the joint having a cross-section tapering substantially in a V-shaped manner inward into the joint or a semicircular cross-section.

6. The vacuum valve as claimed in claim 1, the cavity being formed in the second rod recess and the pin being arranged in the clamping piece.

7. The vacuum valve as claimed in claim 1, the mechanical fixing element being in the form of at least one screw extending substantially perpendicularly to the plane of the closure plate, the clamping piece being inserted to the side of the first rod recess with a section into an undercut which is formed on the fastening side of the closure plate and is formed in such a way that the clamping piece is fixed in the direction pointing away from the closure plate and perpendicular to the plane of the closure plate, the screw being arranged in a first hole which is formed to the side of the first rod recess on the fastening side of the closure plate and extends substantially perpendicularly to the plane of the closure plate and a corresponding second hole in the clamping piece, which extends substantially perpendicularly to the plane of the closure plate, and the undercut, the first hole, the second hole and the section of the clamping piece being arranged and formed in such a way that the screw presses the clamping piece in a lever-like manner with the second rod recess onto the connecting section of the thrust rod.

8. The vacuum valve as claimed in claim 7, the first hole being a threaded hole which the screw engages, and the screw being passed through the second hole.

9. The vacuum valve as claimed in claim 7, the second hole being a threaded hole which the screw engages, and the screw being passed through the first hole.

10. The vacuum valve as claimed in claim 1, the valve drive being formed in such a way that the thrust rod is linearly adjustable by means of the valve drive along the thrust rod axis, the valve seat surface curving in a closed manner around the opening, the normals to the at least partly curved valve seat surface and to the closure surface being substantially parallel to the plane of the closure plate and the closure plate being linearly displaceable by means of the valve drive along the linear adjustment path of the thrust rod, which adjustment path is parallel to the thrust rod axis, between an opened position freeing the opening and a position in which said opening is sealed gas-tight and said closure plate is linearly displaced over the opening and hence pressed with the closure surface substantially in the closing direction of the linear adjustment path onto the valve seat surface.

11. The vacuum valve as claimed in claim 1, the valve drive, the valve seat surface and the closure surface being formed in such a way that the opening can be closed by moving the closure plate substantially along the thrust rod axis over the opening and pressing the closure plate with the closure surface onto the valve seat surface in the perpendicular direction to the plane of the closure plate.

12. A closure plate for a vacuum valve as claimed in claim 1, the vacuum valve having, for gas-tight closing of a flow path, a valve housing with an opening for the flow path and a valve seat surface curving around the opening in a closed manner, comprising a closure side and a back parallel and opposite thereto, a closure surface which corresponds to the valve seat surface of the vacuum valve, the normals to the at least partly curved closure surface and to the valve seat surface being substantially parallel to a plane of the closure plate, which plane is defined by the closure plate, and the closure surface being formed in such a way that the closure surface can be pressed in the closing direction of the adjustment path parallel to the thrust rod axis onto the valve seat surface into a position in which said opening is sealed gas-tight and said closure plate has been moved linearly over the opening, at least one concave, semicircular first rod recess, which is formed on a fastening side, which is formed by the closure side or the back, on the closure plate, and which corresponds to a cylindrical connecting section of a thrust rod end of at least one thrust rod, which is linearly displaceable by means of a valve drive along its thrust rod axis which is substantially transverse to the opening axis, the thrust rod axis being substantially parallel to the plane of the closure plate, and fastening means by which the connecting section of the thrust rod can be detachably fixed in the first rod recess, wherein the fastening means are in the form of a clamping piece which has a concave, semicircular second rod recess corresponding to the connecting section, and a mechanical fixing element, by means of which the clamping piece is adjustably mounted on the fastening side of the closure plate in such a way that the semicircular first rod recess and the opposite semicircular rod recess define a cylindrical holding region which is adjustable in width and in which the cylindrical connecting section can be detachably held, a cavity which extends transversely to the thrust rod axis and in which a resilient pin extends transversely to the thrust rod axis and tangentially to the cylindrical holding region being formed in the first rod recess or the second rod recess, the resilient pin projecting with its lateral surface into the cylindrical holding region in such a way that the pin can be clamped with its lateral surface by means of the clamping piece in a joint, which runs transversely to the thrust rod axis in the connecting section of the thrust rod and corresponds to the pin, and the thrust rod being capable of being fixed along the thrust rod axis.

13. The closure plate as claimed in claim 12, the pin being fixed with its two ends in the cavity, and the middle region of the pin, which is not fixed, projecting between the two ends into the cylindrical holding region.

14. The closure plate as claimed in claim 12, the cavity being formed in the second rod recess and the pin being arranged in the clamping piece.

15. The closure plate as claimed in claim 12, the mechanical fixing element being in the form of at least one screw extending substantially perpendicularly to the plane of the closure plate, the clamping piece being inserted into an undercut to the side of the first rod recess, which undercut is formed on the fastening side of the closure plate and is formed in such a way that the clamping piece is fixed in the direction pointing away from the closure plate and perpendicular to the plane of the closure plate, the screw being arranged in a first bore, which is formed to the side of the first rod recess on the fastening side of the closure plate and extends substantially perpendicularly to the plane of the closure plate, and a corresponding second bore in the clamping piece, which extends substantially perpendicularly to the plane of the closure plate, and the undercut, the first bore, the second bore and the clamping piece being arranged and formed in such a way that the clamping piece can be pressed by means of the screw in a lever-like manner with the second rod recess onto the connecting section of the thrust rod.

* * * * *